July 23, 1929.  J. W. CONNELL  1,721,804
ADVERTISING FRAME FOR VEHICLES
Filed Nov. 17, 1927   2 Sheets-Sheet 2
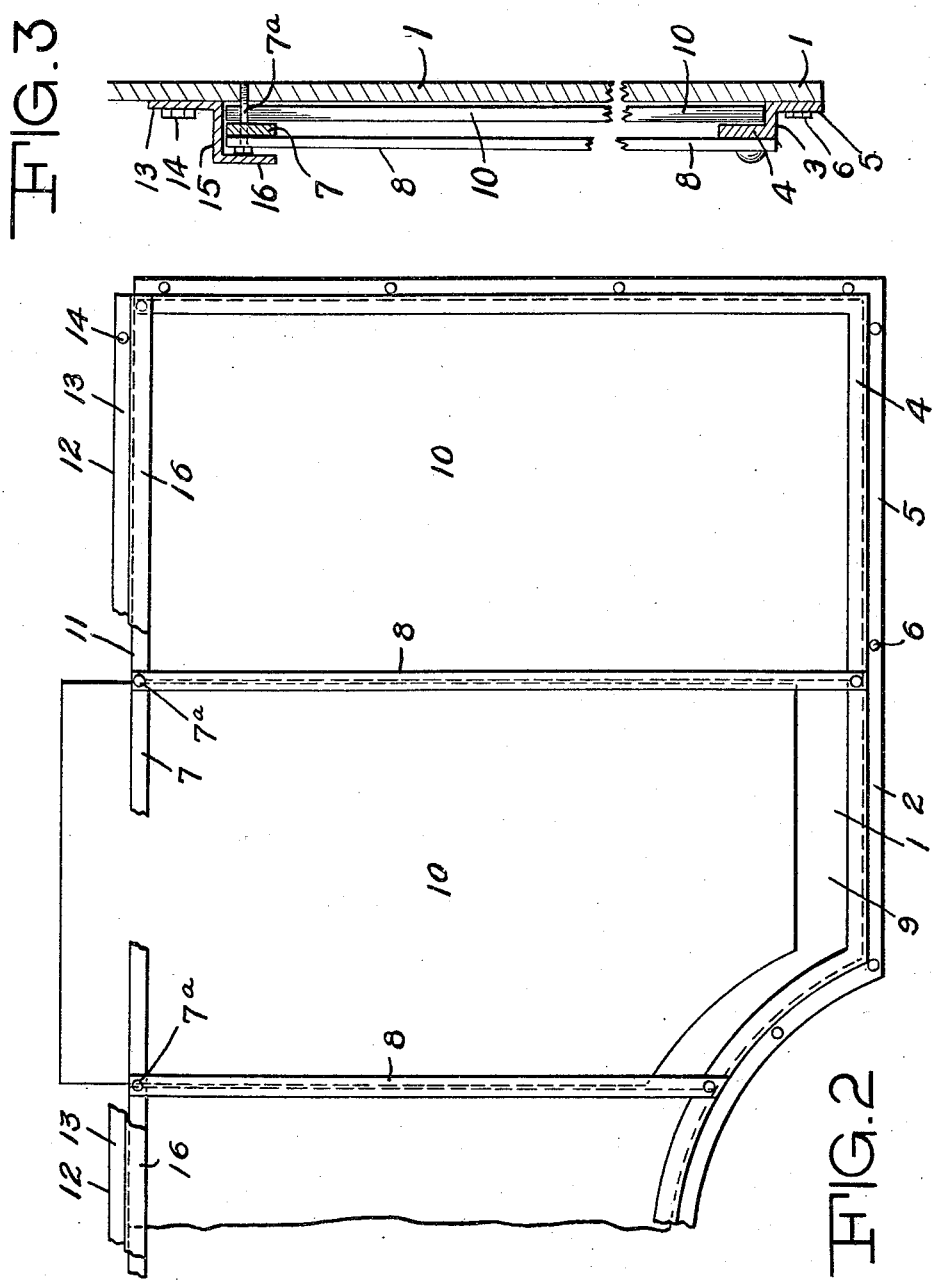
Inventor
J. W. Connell
By
Attorney Patented July 23, 1929.

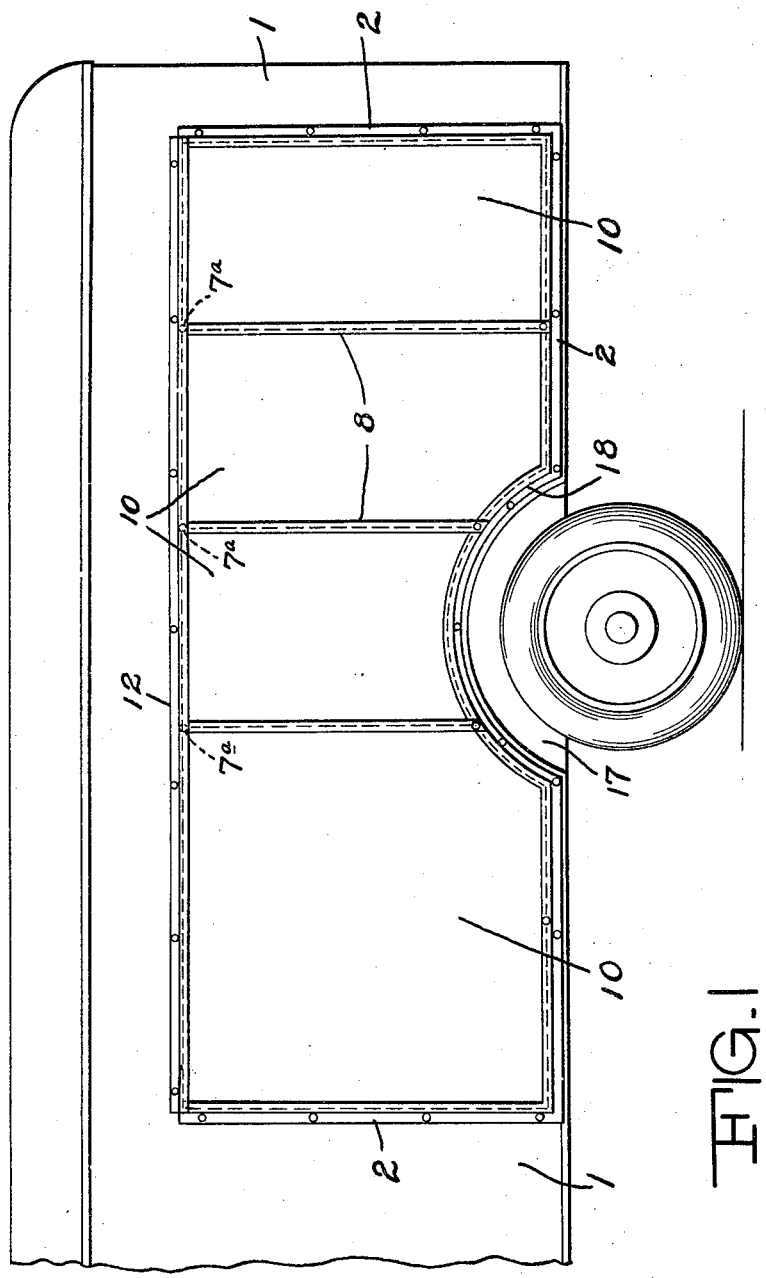

1,721,804

UNITED STATES PATENT OFFICE.

JOHN WILSON CONNELL, OF MONTREAL, QUEBEC, CANADA, ASSIGNOR TO PUBLIBUS LIMITED, OF MONTREAL, QUEBEC, CANADA.

ADVERTISING FRAME FOR VEHICLES.

Application filed November 17, 1927. Serial No. 233,946.

The present invention relates to improvements in an advertising frame, which is fully described hereinafter and illustrated in the accompanying drawings, in which:

Figure 1 is a front elevation view of a frame according to the invention and shown as adapted to a vehicle body.

Figure 2 is an enlarged segmentary front elevation of the frame, and,

Figure 3 is an enlarged vertical cross-section through the frame, advertising panel and the vehicle body.

The principal object of the present invention is to provide outdoor "full" sheet poster advertising upon vehicles such as vans, trucks, delivery wagons and the like, horse driven, or otherwise.

A further object is to provide a frame in which the advertising panels are disposed side by side and parallel to one another, in order to provide for symmetry, and extend across the depth of the frame and cover almost fully the exterior sides of the vehicle.

Another object is to provide a frame in which the removable advertising panels are readily secured therein and prevented from upright and lateral movement.

Like numerals of reference indicate corresponding parts in each figure.

Referring to the drawings, 1 is the body of a vehicle and 2 is a rectangular U-shaped frame consisting of the outward projecting bar 3 having an angular projecting flange portion 4 on one edge thereof, which, when secured to the body of the vehicle, forms a channel or recess to receive the advertising panels and 5 is a downwardly projecting flange on the opposite edge, which is rigidly secured to the body of the vehicle by means of the screws or bolts 6. The upper ends of the flanged portion 4 of the frame are united together of a horizontal and transverse bar 7, which is suitably distanced from said vehicle body, and 8 is a plurality of dividing, preferably, vertical bars suitably distanced from one another and secured at their upper ends to the bar 7 by means of the screws 7ª, which project through said bars 7 and engage into the body of the vehicle. The object of these vertical bars is to divide the frame into two, three or more advertising spaces 9.

In said spaces 9, are suitably mounted the panels 10, upon which may be provided advertising matter, each of said panels being of the size limited by the frame 2, the transverse bar 7 and the vertical bars 8.

The panels 10 may be slid through the upper open end 11 of the frame 2 between the bar 7 and the body of the vehicle. The said panels should be, preferably, slightly larger than the spaces 9, so as to partly engage under the said vertical bars 8 and the transverse bar 7, and thus be secured thereunder. Once the panels are in position, the screws 7ª are tightened to rigidly secure the panels in the frame by causing a pressure to bear thereupon, due to the resiliency of the bar 7, thus securing them into their respective positions. A suitable housing 12 may then be provided to protect said panels from rain and moisture. The said housing consists, preferably, of horizontal bar 13 suitably secured to the body of the vehicle by means of the bolts or screws 14, said bar having an outwardly projecting portion 15 adapted to cover the top of the frame and the panels, and at the edge of said projecting portion 15 is provided a downward depending flange 16, which overlaps the upper edge of the frame and covers the transverse bar 7. This housing is preferably independent of the frame 2.

In large vans, or trucks, the body of the vehicle is usually provided with a depression 17 for the rear wheels. In this case, the frame is made to conform at 18, with said depression, thus slightly reducing the size of one or two of the panels.

To remove the panels 10, the housing should be first removed, and the screws 7ª loosened, to relieve the pressure upon the panels, after which, the panels may be readily pulled out from the frame.

In the frame, herein described, the panels should bear full sheet posters. This is a most important feature, as upon a vehicle, travelling at a relatively high rate of speed, the advertising carried by the said vehicle must be of a size, which will be large enough to easily be read. If half sheet posters were used, the advertisements would not be easily read, on account of their reduced size. It is, therefore, the object to provide a frame which will carry advertising panels, covering, as fully as possible, the outer-side of the vehicle, without having to alter its construction.

It was necessary, in providing the present frame, to provide a most simple and economical construction, and this is attained by providing panels which lie side by side, the edges of one panel, preferably abutting against the edge of the adjacent panel, thus eliminating a partition or some other means between the said panel.

Further, to properly and firmly secure the panels in the frame, it is thought that the best and simplest means is that already described, and consists, principally, in tightening or compressing the vertical bars 8 and transversal bars 7 against the edges of the panel through the medium of the screw $7^a$ or their equivalent. This will have the further effect of eliminating rattling, which is an important factor.

What I claim as my invention:—

1. An advertising frame for vehicle bodies, consisting of a U-shape frame having an open top, a horizontal and transverse frame bar suitably spaced from said body and secured to open ends of said frame, one or more dividing bars secured to the bottom of said frame and connected at the other end to said horizontal bar, whereby a plurality of advertising spaces are provided, advertising panels of suitable size fitting in said spaces, and means upon said dividing bars to press said transversal bar against said panels to firmly secure said panels in said frame.

2. An advertising frame consisting of a U-shape frame having an open top, a horizontal frame bar secured to open ends of said frame, one or more dividing bars secured to the bottom of said frame and connected at the other end to said horizontal bar, and means upon said dividing bars to depress said horizontal bar.

3. An advertising frame for vehicle bodies, comprising a U-shape frame having an open top, a horizontal and transverse frame bar suitably spaced from said body and secured to open ends of said frame, one or more dividing bars secured to the bottom of said frame and connected at the other end to said horizontal bar, whereby a plurality of advertising spaces are provided, advertising panels of suitable size fitting in said spaces, means upon said dividing bars to press said transversal bar against said panels to firmly secure said panels in said frame, and a removable housing to cover said horizontal frame bar.

Signed at Montreal, Quebec, Canada, this 28th day of October, 1927.

JOHN WILSON CONNELL.